Inventor:
F.H.A. Wielgolaski

F. H. A. WIELGOLASKI.
CONTROLLING MECHANISM FOR LOOMS.
APPLICATION FILED APR. 25, 1916.

1,355,200.

Patented Oct. 12, 1920.
6 SHEETS—SHEET 3.

Inventor:
F.H.A.Wielgolaski by [signature]
Attorney

UNITED STATES PATENT OFFICE.

FRANS HENRIK AUBERT WIELGOLASKI, OF CHRISTIANIA, NORWAY.

CONTROLLING MECHANISM FOR LOOMS.

1,355,200.     Specification of Letters Patent.     Patented Oct. 12, 1920.

Application filed April 25, 1916. Serial No. 93,359.

*To all whom it may concern:*

Be it known that I, FRANS HENRIK AUBERT WIELGOLASKI, a subject of the King of Norway, and residing at Christiania, Norway, have invented a new and useful Controlling Mechanism for Looms; and I do hereby declare the following to be a full, clear, and exact description of the same.

This invention relates to machines for interweaving slats and wires, and more particularly to means for automatically starting the machine in operation controlled by the insertion of one of the elements of the product to the machine, the machine being automatically stopped at the end of a cycle.

The particular machine to which the illustrated embodiment of this invention is applied, is adapted for producing sheet lathing or a fabrication of slats of wood with wires, the wood slats preferably forming the weft element thereof. A machine of the class is disclosed in the British Patent #20922, of 1911.

According to the present invention, upon the insertion into the machine, a slat is brought to bear against one or more feelers which control the automatic starting mechanism whereby the machine is put into operation for a single cycle, the operation of the machine causing the warp wires to be interwoven with the slat which was instrumental in starting the machine. The automatic means for starting the operation of the machine may comprise a movable member located in the path of the slats to be operated by said slats when moving to position to be woven.

Other features and advantages will hereinafter appear.

In the accompanying drawings:—

Fig. 1ᵃ is a transverse section through part of the weaving mechanism showing one form of my invention for controlling the starting of the weaving mechanism.

The form of machine to which the present invention may be applied is adapted for interweaving the slats 1 and wires A and B. The wires A are comparatively heavy and form the foundation of the warp. The wires B serve to bind or weave the slats 1 to the foundation wires A. These binding wires are carried upon a reel C mounted on a sleeve D passing through the hub 10 which sleeve is provided with a bevel gear E, the leading end of the wire B from each reel passing through a sleeve 11 mounted on an arm carried by the sleeve D so that the wire B will be twisted around the wire A and the slat when the sleeve D with the parts carried thereby is rotated. This rotation of the sleeve D and the parts carried thereby is controlled by a drive shaft F having bevel gears G engaging the bevel gears E on the sleeve D of the weaving mechanism. At the proper time, the drive shaft F is rotated to cause the wires D to be rotated and wound about the foundation wire A, the drive shaft F being provided with a clutch H mounted to slide on the shaft into engagement with a clutch I carried by a driving pulley J. The clutch H is controlled by a fork K operated by a shaft L to move the clutch into and out of engagement with the continuously rotating clutch member I. The shaft L ordinarily is provided with a handle or other suitable operating means whereby the operator after having positioned a slat in the machine starts the machine by connecting the clutch members H and I. This causes the slat so positioned to be woven and bound to the foundation wire A by the wires B which rotate around the wires A, the wires A passing through the center of the sleeve D and thereby being relatively stationary while the weaving takes place. After the weaving has continued for the desired number of turns, the mechanism is automatically stopped by the controlling disk M suitably geared to the drive shaft F, as shown in the British patent, the fork K having a lug N for engagement with the face O of said disk and being adapted to drop into a notch P therein to cause the operation of the machine to cease by separating the clutch elements H and I.

A carriage 14 is provided with combs 15 for moving the slats to the right position before the weaving operation takes place. This carriage is suitably mounted in the frame of the machine and is reciprocated as disclosed in the British patent.

The machine above described forms the subject of British Patent 20922 of 1911 to which reference should be had for a more complete description of the structure and operation of the parts described.

As has been said, in this form of machine it has been customary to manually control the starting operation of the machine by a separate operation after a slat is in proper position. The object of this invention is to provide automatic means for performing this operation. In one of its simplest forms this invention comprises a feeler 4 (see Figs. 1 and 1ª) mounted in the path of the slat 1 in its longitudinal movement between the warp elements, and adapted to be operated by the end 3 of the slat when said slat is moved to exactly the proper position relative to the warp elements preparatory to weaving. The feeler 4 is mounted to slide on a guide 5 and is pivotally carried at 6 upon a lever 7 which lever is connected by a link 7ª to an arm 7ᵇ on the control shaft L. When the slat engages the feeler 4 the arm 7 is rocked against the tension of the spring 12 to rock the shaft L and to thus cause the clutch members H and I to engage, whereupon the machine operates through a single cycle to weave the slats so positioned to the foundation wire A.

Figure 2:
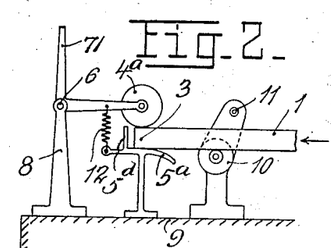
Fig. 2 is a similar view showing a slightly modified form thereof, a single roller being positioned for engagement with the end of the slat being positioned.
Figure 3:
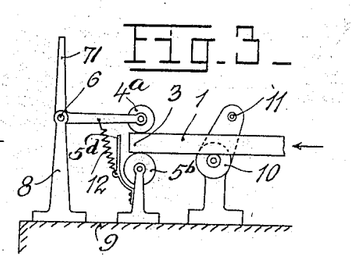
Fig. 3 is a similar view but showing upper and lower rollers positioned for engagement with the end of a slat.
Figure 4:
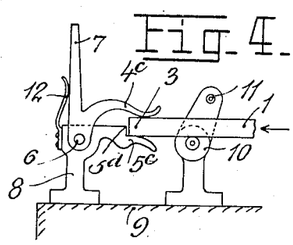
Fig. 4 is a modification of the form shown in Fig. 3 curved arms being substituted for the rollers.

In the form shown in Figs. 2 and 3; the abutment or operating lug of the feeler 4 is replaced by a roller 4ª; and, instead of being carried for pivotal movement upon an arm 71, the arm 71 is made integral with said feeler and in the form of a bell crank pivoted at 6 upon a standard or support 8. The guide 5 is replaced in Fig. 2 by a curved guide 5ª so that the slat in moving to position will cause its end 3 to wedge between the fixed curved guide 5ª and the roller 4ª and thereby rock the bell crank 71 which is connected by a suitable link and arm to the control shaft L. In Fig. 3 the fixed guide 5ª is replaced by a roller 5ᵇ to facilitate the entrance of the end 3 of the slat between said guide and the feeler roller 4ª. In Fig. 4 instead of a feeler roller 4ª and a guide roller 5ᵇ there are two curved members 4ᶜ and 5ᶜ for performing the same operation. In Figs. 2, 3 and 4, the guide members are provided with stops 5ᵈ for limiting the movement of and positioning of the slat 1 relative to the warp elements A and B.

Figure 5:
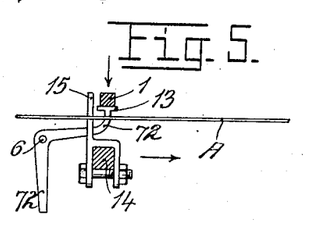
Fig. 5 shows another form of my invention wherein a tripper is positioned for engagement with the slat to be operated by a downward pressure of the slat.
Figure 6:
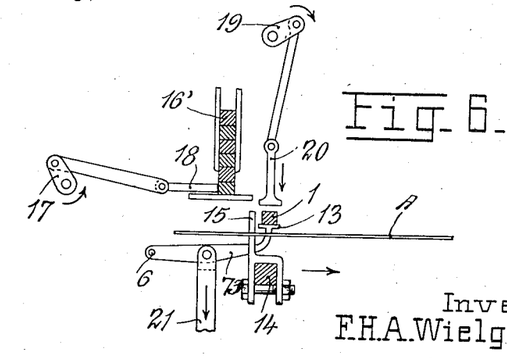
Fig. 6 is a similar view showing automatic means for feeding the slats to working position and mechanical means for producing the downward pressure on the slat.

In the forms described it was stated that the slat is moved longitudinally between the warp members. If the slats are moved downwardly to position it is preferred to employ a feeler in the nature of that disclosed in Figs. 5 and 6. In the form shown in Fig. 5 the arm 72 is provided with a table or engaging member 13 upon which the slat 1 rests. In this form the weight of the slat 1 may be used to operate the arm 72 under some circumstances. However, it is preferred that separate means be employed for causing the slat 1 to operate the controlling arm 72. One form of this means is shown in Fig. 6 wherein a plunger 20 is mounted to engage and depress the slat 1 the plunger 20 being operated by a link and crank 19 driven by power and under the control of the weaving mechanism. Preferably, the arrangement is such that the plunger 20 operates continuously but does not operate the feeler 73 shown in this figure unless a slat 1 is interposed between the support member 13 and the end of the plunger. With this form of device it may be convenient to feed the slats automatically from a hopper 16' by means of a plunger 18 and a link and crank 17 driven by power. In this case the operation of the plungers 18 and 20 will be properly timed so that after the plunger 18 operates to feed a slat the plunger 20 operates to depress the same. In Figs. 5 and 6 the carriage 14 and comb members 15 are shown; this carriage being reciprocated automatically carries the slats 1 away from the supporting member 13 of the controlling arm 73 to proper position longitudinally of the warp for weaving.

Figures 1, 17:
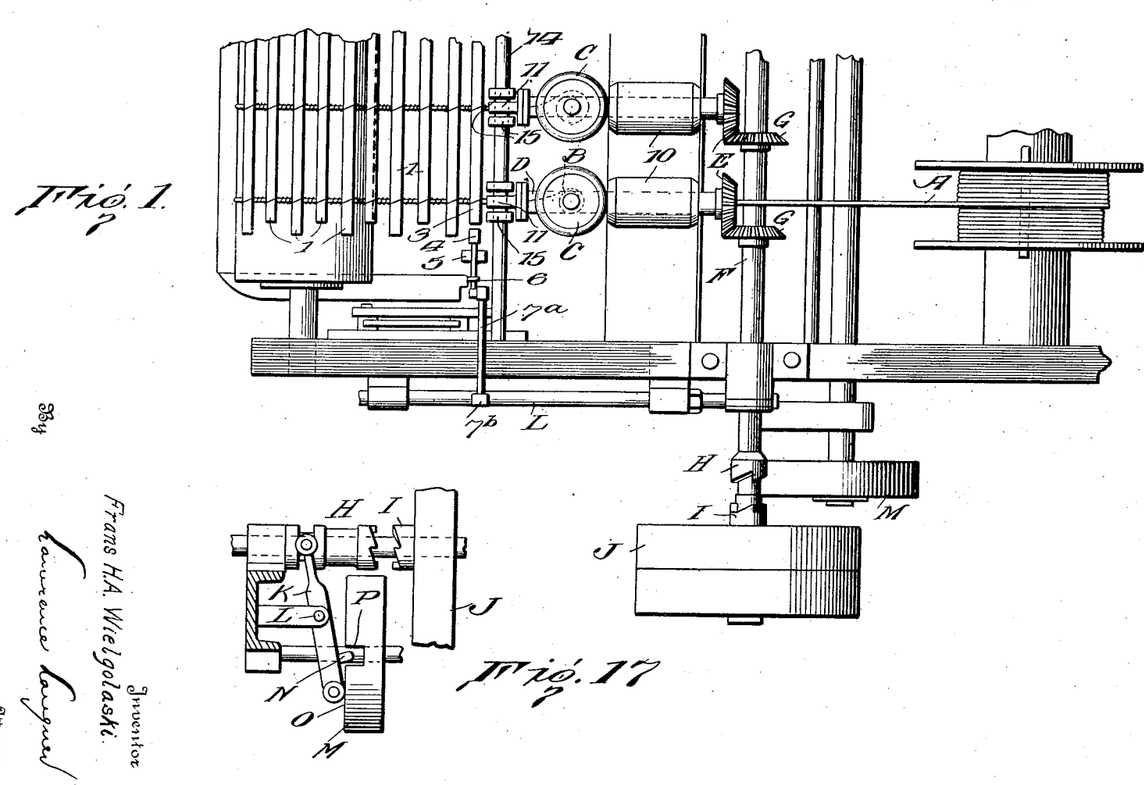
Figure 1 is a top plan view of a portion of a machine for interweaving slats and wires showing one embodiment of my invention as applied thereto.
Fig. 17 is a view showing the clutch mechanism of the machine with the automatic mechanism for stopping the weaving mechanism associated therewith.
Figure 1A:
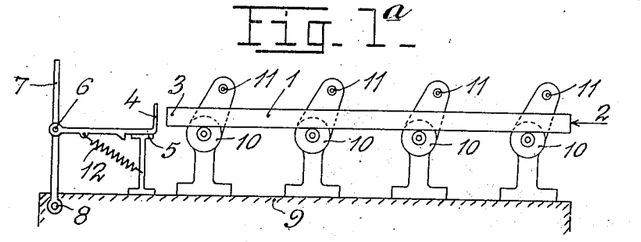
Figure 12:
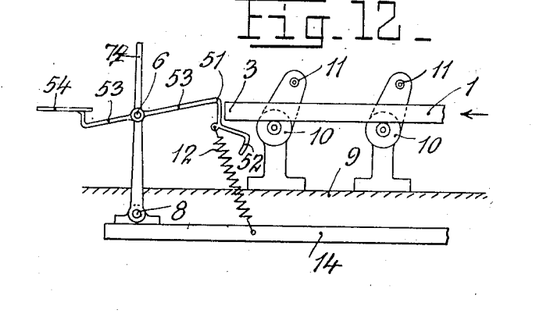
Fig. 12 is a view similar to Fig. 1ᵃ but showing an embodiment of this invention wherein the slat positioning means having two steps is operable in both its positions to start the operation of the weaving mechanism.
Figure 13:
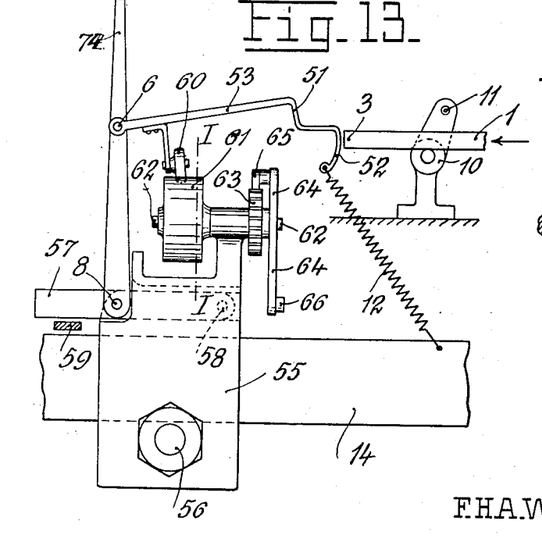
Fig. 13 is a similar view showing means for controlling the position of the stop member.
Figure 14:
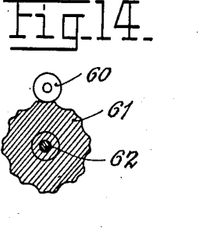
Fig. 14 is a detail of the step-positioning roller used in the form shown in Fig. 13.

It will be noted that one form of the product of this machine may comprise slats arranged in staggered relation to one another. Where a product of this form is to be manufactured the feeler for controlling the starting operation of the machine should be operable for both positions of the slats. I have therefore provided means for this purpose, a form of which is shown in each of Figs. 12, 13 and 15. In the form shown in Fig. 12 the feeler 4 of Fig. 1 is replaced by a feeler or stop member 53 having a step 51 and a step 52 for engaging the ends 3 of the slats. The feeler 53 in addition to being carried on the controller arm 74 for bodily movement with said arm 74 under control of the slat 1, is pivotally mounted for an arcuate movement on said arm 74 so as to bring either the step 51 or the step 52 to operative position. The feeler member 53 is provided with an arm 54 for engagement with a cam or other suitable device whereby its position is varied to bring either step into use. Fig. 13 shows one form of mechanism which may be used for shifting the feeler 53 for the above described purpose. This means comprises a roller 60 carried by an arm on a wheel 61 mounted on a shaft 62 and operated step by step by a ratchet 63, pawl 65 and an arm 64 carried by the shaft 62. Suitable connections 66 connected to the stationary part of the frame shown in Fig. 1 are provided for moving the controlling disk 61 step by step one step for each weaving operation so that the adjacent slats will be offset or staggered, the controlling disk 61 being provided with high and low points for altering the position of the feeler 53.

The positioning mechanism for the feeler 53 is carried by a block or supporting member 55 on the carriage 14 so as to move the feeler with the carriage and combs carried thereby when moving a slat longitudinally of the warp in weaving. The controlling member 74 is pivoted at 8 to an arm 57 pivoted on the block 55. The arm 57 is controlled by a wedge 59 attached to the machine frame so as to raise the arm 74 in the weaving position of the carriage so that the stepped faces fall down between the slats and the arm 74 may swing back without hindrance by the slats.

Figure 15:
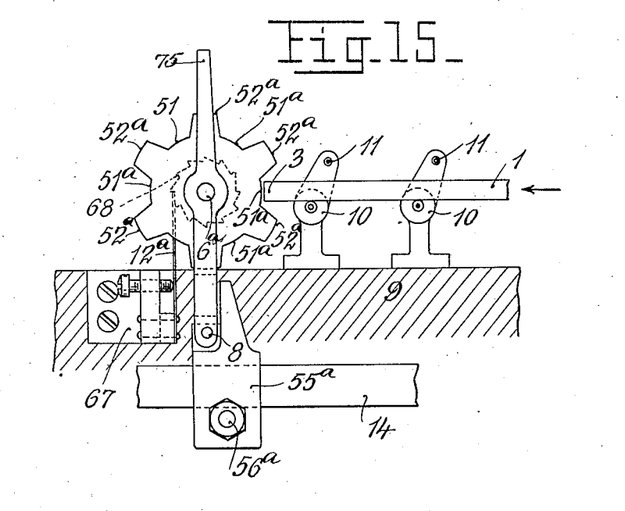
Fig. 15 is a view showing an embodiment of this invention wherein a rotary stop member is used to position the slats and to start the operation of the machine, said rotary member being automatically rotated step-by-step by the operation of the machine.
Figure 16:
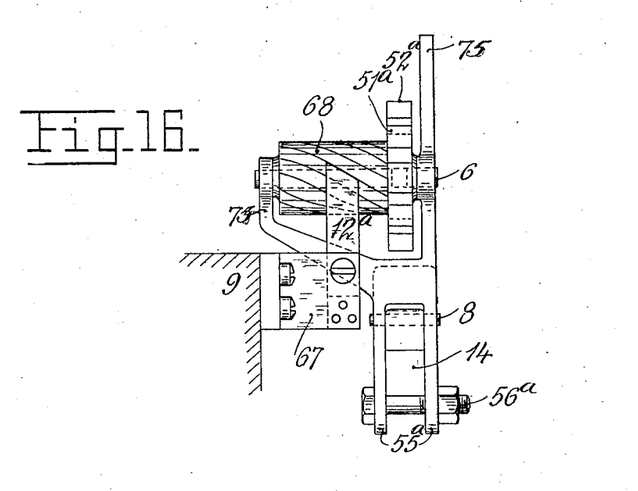
Fig. 16 is a side view of part of the mechanism shown in Fig. 15.

Another form of mechanism for the same purpose is illustrated in Figs. 15 and 16. In this form of device the steps 51$^a$ and 52$^a$ are arranged on a rotatable disk so as to be brought into position *seriatim* as the weaving progresses. The disk is carried by a shaft 6$^a$ on a controlling arm 75 which has suitable connections to the control shaft L, the controlling arm 75 being pivoted at 8$^a$ to a block 55$^a$ secured by the connection 56$^a$ to the carriage 14. When the slat 1 is moved to position to be woven it engages one of the steps of the rotary stop member and rocks the arm 75 in the usual manner. The disk is moved step by step by a spiral ratchet 68 engaged by a spring pawl 12$^a$ which pawl serves the purpose of returning the controlling member 75 and also moving the disk step by step with each operation thereof. The spring pawl 12$^a$ is suitably carried by a block 67 carried by the machine frame and has a screw whereby its tension is adjusted. It will be understood that as the carriage 14 is reciprocated the stop disk is rotated because of the spiral grooves of the ratchet to temporarily move the stop faces out of engagement with the slats. As the carriage is returned however, the spiral groove causes the stop disk to be returned or rotated back to the position it occupied before the carriage was reciprocated. The stop disk is held with one of its stop faces co-acting with the end of the slat during the swinging movement of the controlling arm 75 by the spring pawl 12$^a$ which movement however causes the disk to be slightly rotated on its shaft 6$^a$. When returning to normal position the disk moves with the shaft thus permitting the next notch to be engaged by the pawl 12$^a$.

Figure 7:
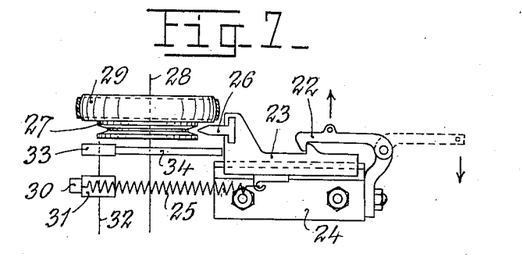
Fig. 7 is a detail diagrammatic view showing an auxiliary power mechanism for operating the clutch mechanism of the machine.
Figure 8:
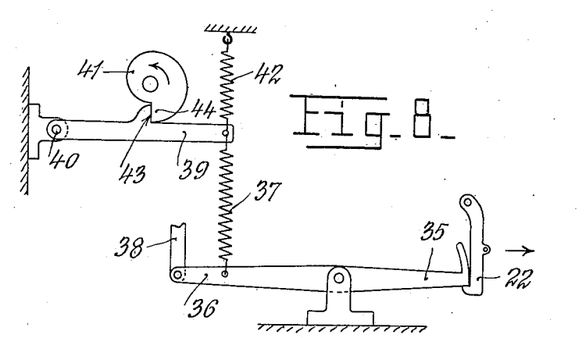
Figs. 8, 9 and 10 are views of similar mechanism.
Figure 9:
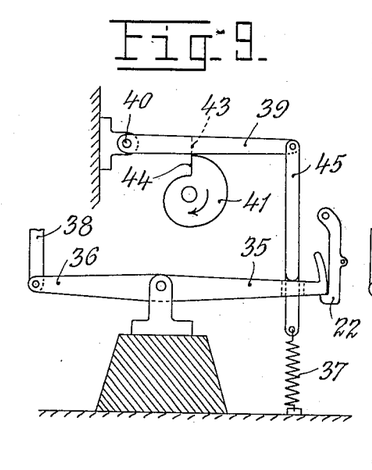
Figure 10:
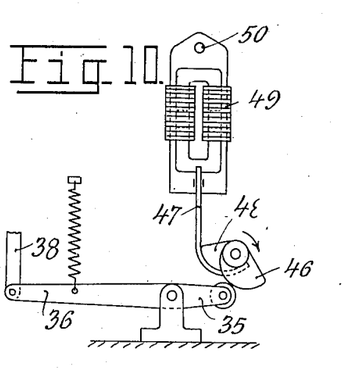
Figure 11:
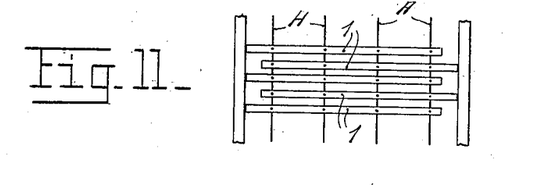
Fig. 11 shows the product of the machine, wherein the slats are staggered.

In some forms of the device and under certain conditions it is not feasible or practical to cause the feeler or feelers to directly actuate the clutch. I have provided, therefore, means whereby an auxiliary source of power is brought into operation to do the actual work of shifting the clutch under the control of the feeler or feelers. Means for this purpose are illustrated in Figs. 7, 8, 9 and 10. In Fig. 7 a latch or tripper 22 is connected by a link or other connection to the arm 7 (or any of its equivalents) of the feeler mechanism. This latch serves to normally withhold a slide 23 mounted on support 24 against the tension of a spring 25. When the latch is released the slide 23 moves under the influence of the spring 25, to engage a V-shaped groove 27 on a pulley 29 on a shaft 28 driven by a suitable belt driven by the source of power. This pulley preferably rotates continuously and therefore, when the member 26 is moved into engagement therewith, said member 26 is caused by frictional engagement to be moved by the pulley. The member 26 is slidably mounted in the slide 23 and is connected to operate the shaft L of the clutching mechanism. For the purpose of tensioning the spring and for the purpose of returning the slide 23 another shaft 32 connected to the power mechanism may be provided with suitable cams, a cam 33 being provided to engage a plunger 34 to engage and return the slide 23 and a cam 31 engaging an arm 30 carrying the spring 25. In the form shown in Fig. 8 a lever 35 having an arm 36 provided with a link 38 extending to the control shaft L is normally prevented from moving by a tripper 22. When the machine is in stopped position a spring 37 carried by an arm 39 is tensioned which spring tends to move the lever 35 to throw in the clutch but is prevented from doing so by the tripper 22. The spring 37 is carried by an arm 39 pivoted at 40 and carrying an upwardly extending lug 43 adapted to be engaged by a snail cam 41. The snail cam has a high part 44 which depresses the arm 39 during the close of the cycle of operation of the machine to permit said arm 35 to be again caught by the tripper 22. The arm 39 is also engaged by a spring 42 which holds the arm 39 against the cam 41. At the close of the operation, the lug on the arm 39 enters the drop and thus permits the spring 37 to be tensioned by the spring 42 so that when the tripper 22 is disengaged from the lever 35 the control shaft will be operated to start the machine. In the form shown in Fig. 9 the lever 35 connected by the link 38 to the control shaft L is also normally held against operation by a tripper 22. The spring 37 is not however directly connected to the arm 35 but instead is connected to a link 45 carried by an arm 39 which arm is controlled by a cam 41, the link 45 having contact engagement with the lever 35. The link 45 is moved away from the lever 35 during the close of the cycle of operations of the machine by a high part 44 on the cam 41 to permit the lever 35 to be reëngaged by the tripper 22. When the drop on the cam 41 is opposite the lug 43 on the arm 39 the link 45 reëngages the lever 35 to permit the tension of the spring 37 carried thereby to operate the lever 35 when the tripper is removed therefrom. It will be clearly understood that the tripper 22 in each of these forms above described is connected by a suitable link or other mechanism to the arm 7 of the feeler mechanism. As another example of a manner in which the control shaft L may be operated, I illustrate in Fig. 10 a solenoid 49 carried by a support 50. The armature of the solenoid 49 is connected by a flexible connection 47 by a carrier 48 to a shaft carrying a cam 46. The cam 46 engages a roller on the arm 35 connected by the link 38 to the control shaft L so that when the solenoid is energized the link 38 will be operated to cause the clutch to be shifted to a position to connect the drive shaft F to the power pulley J. To energize the solenoid it may be connected to a suitable source of power and the feeler may be provided with a switch for closing the circuit. This last mentioned mechanism is so conventional that its illustration is not believed to be necessary.

From the foregoing it will be clear that I have provided a machine for interweaving slats and wires having weaving mechanism, means for controlling the operation of the weaving mechanism and means controlled by a slat in moving to position to be woven for causing the operation of the weaving mechanism.

Figure 18:
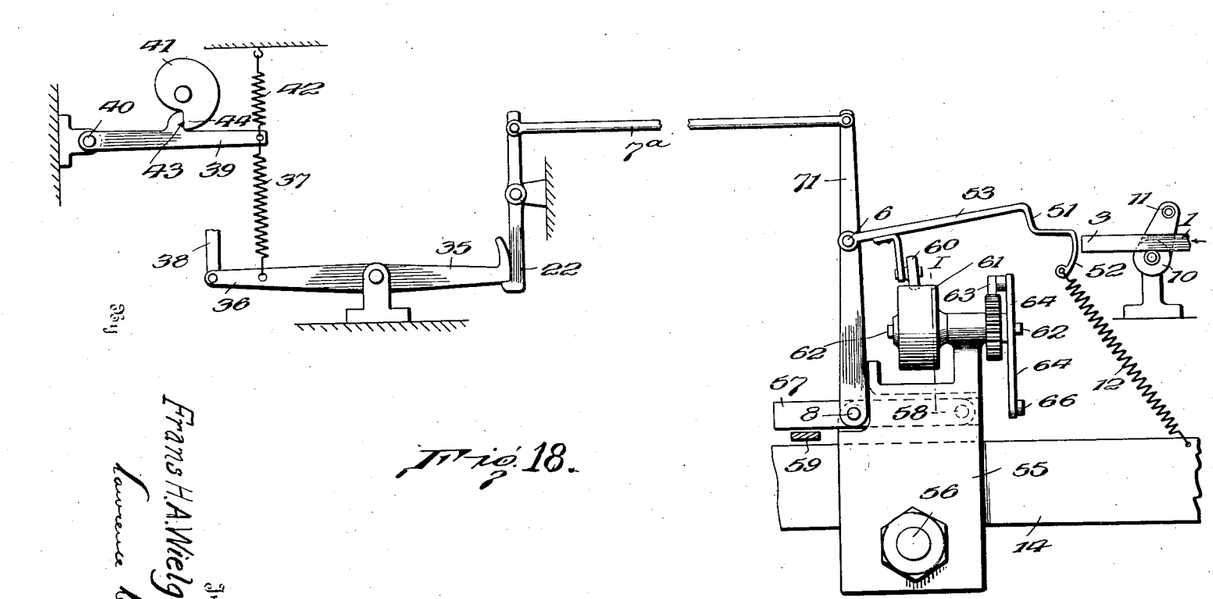
Fig. 18 shows the form of feeler mechanism shown in Fig. 13 combined with the form of auxiliary power mechanism shown in Fig. 8.

In Fig. 18 there is shown diagrammatically the automatic clutch throwing mechanism and the variable stop feeler mechanism for controlling the throwing of the clutch. It will be noted that the feeler mechanism is provided with the usual link 7a but which instead of leading direct to the shaft L is connected to the tripper 22 of the automatic mechanism for throwing the clutch. When the feeler mechanism is operated by a slat 1 the rod 7a is operated to withdraw the tripper 22 from the arm 35 so as to permit the spring 37 previously tensioned to rock said arm 35 and thereby cause the link 38 connected to the clutch shaft L to operate and throw the clutch.

Variations may be resorted to within the scope of the invention and portions of the improvements may be used for others.

I claim as my invention:—

1. In a loom, the combination of means for controlling the position of the weft elements of the product relative to the warp elements thereof; means for operating the loom; and means controlled by the weft position-controlling-means for starting the operation of the loom.

2. In a loom, the combination of means for controlling by its position the position of the weft elements of the product relative to the warp elements thereof to cause alternate weft elements to be staggered; operating means for the loom; and means controlled by the weft position-controlling-means in all its positions for starting the operation of the loom.

3. In a loom, the combination of means for controlling the position of the weft elements of the product to the warp elements thereof, said means being positioned for engagement with a weft element when moved to position between the warp elements to be woven, and said means having a limited movement under the control of the weft element; means for causing the warp elements to be moved to bind the weft element so positioned, and means operated by the weft position - controlling - means limited movement for causing the operation of the warp element moving means.

4. In a machine for interweaving slats and wires, the combination of weaving mechanism; means for controlling the operation of the weaving mechanism; and means controlled by a slat in moving to position to be woven for causing the operation of the weaving mechanism.

5. In a machine for interweaving slats and wires, the combination of weaving mechanism; means for operating said weaving mechanism and normally disconnected therefrom; and means controlled by a slat in moving to position to be woven for causing said operating means to be connected to the weaving mechanism whereby the weaving mechanism is caused to operate.

6. In a machine for interweaving slats and wires, the combination of weaving mechanism; intermittently operating means for said weaving mechanism; and means controlled by a slat in moving to position to be woven for automatically starting the operation of said intermittently operating means.

7. In a machine for interweaving slats and wires, the combination of weaving mechanism; operating means therefor; a stop device for controlling the positions of the slats relative to the wires, said stop having two steps to position the slats differently; means for automatically controlling the stop device for bringing one or the other of the steps to operative position; and means operated by said device in either position for causing the operating means to operate the weaving mechanism.

8. In a machine for interweaving slats and wires, the combination of weaving mechanism; operating mechanism therefor; a stop device for controlling the position of the slats relative to the wires, said stop device having steps to position the slats differently; means for automatically controlling the stop device to bring either of the steps to operative position; supporting means on which said stop device is mounted for bodily movement under the influence of the slat in moving to position to be woven; and means connected to the stop device supporting means for causing the operating means to operate the weaving mechanism.

9. In a machine for interweaving slats and wires, the combination of weaving mechanism; operating mechanism therefor; a stop device for controlling the position of the slats relative to the wires; means for supporting the stop device for bodily movement under the influence of the slat in moving to position to be woven; and means connected to said supporting means for automatically causing the operating means to operate the weaving mechanism.

10. In a machine for interweaving slats and wires, the combination of weaving mechanism; operating mechanism therefor normally disconnected from said weaving mechanism; means controlled by a slat in moving to position to be woven for causing said operating means to be connected to the weaving mechanism whereby the weaving mechanism is caused to operate; and means for again disconnecting the operating means for the weaving mechanism after said mechanism has completed a single cycle of operations.

11. In a loom for interweaving slats and wires, the combination of means for controlling the position of the weft elements of the product relative to the warp elements thereof; means for operating the loom; means controlled by the weft position controlling means for starting the operation of said loom operating means; and means for stopping the operation of the loom operating means after the loom has completed a single cycle of operations.

12. In a loom for interweaving slats and wires, the combination of means for controlling the position of the weft elements of the product relative to the warp elements thereof; means for operating the loom; means controlled by the weft position controlling means for starting the operating means comprising a trip operated thereby; and a separate source of power controlled by said trip for performing the operation of connecting the operating means to the loom.

13. In a machine for interweaving slats and wires, the combination of weaving mechanism; a drive shaft therefor; a clutch for connecting the drive shaft to the weaving mechanism for causing the operation thereof; and means operated by a slat in moving to position to be woven for causing said clutch to connect the drive shaft with the weaving mechanism whereby said drive shaft operates the weaving mechanism.

14. In a machine for interweaving slats and wires, the combination of weaving mechanism; a drive shaft therefor; a clutch for connecting the drive shaft to the weaving mechanism for causing the operation thereof; means operated by a slat in moving to position to be woven for causing the clutch to connect the drive shaft to the weaving mechanism; and means for causing said clutch to disconnect the drive shaft from the weaving mechanism after said mechanism has completed a single cycle of operations.

15. In a machine for interweaving slats and wires, the combination of weaving mechanism; a drive shaft therefor; a clutch for connecting the drive shaft to the weaving mechanism for causing the operation thereof; a tripper mounted in position to be engaged by a slat in moving to position to be woven; power means for moving said clutch to operative position; means controlled by the tripper and freed thereby for permitting said power means to move said clutch to operative position whereby the weaving mechanism is operated by the drive shaft.

In testimony whereof I have signed my name to this specification in the presence of two subscribing witnesses.

FRANS HENRIK AUBERT WIELGOLASKI.

Witnesses:
AXU LAHN,
MOGENS BUGGE.